United States Patent
Nakamura et al.

(10) Patent No.: US 8,990,716 B2
(45) Date of Patent: Mar. 24, 2015

(54) CHRONOLOGY PROVIDING METHOD, CHRONOLOGY PROVIDING APPARATUS, AND RECORDING MEDIUM CONTAINING CHRONOLOGY PROVIDING PROGRAM

(75) Inventors: Takatoshi Nakamura, Ibaraki (JP); Yoichiro Sako, Tokyo (JP); Itaru Kawakami, Kanagawa (JP); Mitsuru Takehara, Tokyo (JP); Yuichi Abe, Tokyo (JP)

(73) Assignee: Sony Corporation, Tokyo (JP)

( * ) Notice: Subject to any disclaimer, the term of this patent is extended or adjusted under 35 U.S.C. 154(b) by 1510 days.

(21) Appl. No.: 12/009,112

(22) Filed: Jan. 16, 2008

(65) Prior Publication Data
US 2008/0177693 A1    Jul. 24, 2008

(30) Foreign Application Priority Data
Jan. 19, 2007 (JP) .................. 2007-009708

(51) Int. Cl.
| | |
|---|---|
| *G06F 3/048* | (2013.01) |
| *G06F 17/30* | (2006.01) |
| *G06Q 10/10* | (2012.01) |
| *G06Q 10/06* | (2012.01) |

(Continued)

(52) U.S. Cl.
CPC .......... *G06F 17/30064* (2013.01); *G06Q 10/06* (2013.01); *G06Q 10/109* (2013.01); *G06F 17/30044* (2013.01); *Y10S 715/963* (2013.01); *G06T 11/206* (2013.01); *G06Q 10/10* (2013.01); *G06F 3/0481* (2013.01); *G06F 17/30551* (2013.01); *G06F 3/048* (2013.01)

USPC .......... 715/764; 715/703; 715/708; 715/963; 707/725; 707/746

(58) Field of Classification Search
CPC ................ G06F 17/30064; G06F 17/30044; G06F 17/30551; G06F 3/0481; G06Q 10/109; G06Q 10/06; G06Q 10/10; G06T 11/206; Y10S 715/963
USPC .......... 715/703, 708, 764, 963; 707/725, 746
See application file for complete search history.

(56) References Cited

U.S. PATENT DOCUMENTS 7,069,003 B2 * 6/2006 Lehikoinen et al. ........ 455/414.2
8,009,575 B1 * 8/2011 Spain et al. .................. 370/252
8,176,527 B1 * 5/2012 Njemanze et al. ............. 726/2

(Continued)

FOREIGN PATENT DOCUMENTS

| EP | 0939378 A2 | 9/1999 |
|---|---|---|
| JP | 10-162078 A | 6/1998 |

(Continued)

*Primary Examiner* — Patrick Riegler
(74) *Attorney, Agent, or Firm* — Wolf, Greenfield & Sacks, P.C.

(57) ABSTRACT

A method for providing chronologic information that is generated by placing one or more pieces of related information according to information about elapsed time is provided. The method includes the steps of obtaining, by an obtaining unit, (i) basic information associating pieces of the related information with the information about time indicating positions on the chronologic information and (ii) information indicating a display form of the chronologic information; and providing, by a control unit, the chronologic information to a user by displaying the chronologic information in a display unit based on the information indicating a display form of the chronologic information by using the basic information.

13 Claims, 9 Drawing Sheets

(51) Int. Cl.
    *G06T 11/20*     (2006.01)
    *G06F 3/0481*    (2013.01)

(56) References Cited

U.S. PATENT DOCUMENTS

| | | | | |
|---|---|---|---|---|
| 2004/0056903 | A1* | 3/2004 | Sakai | 345/853 |
| 2004/0093589 | A1* | 5/2004 | Master | 717/136 |
| 2005/0055625 | A1* | 3/2005 | Kloss | 715/500.1 |
| 2006/0010382 | A1* | 1/2006 | Ejiri et al. | 715/712 |
| 2006/0221184 | A1* | 10/2006 | Vallone et al. | 348/155 |
| 2006/0224993 | A1* | 10/2006 | Wong et al. | 715/800 |
| 2006/0238538 | A1* | 10/2006 | Kapler et al. | 345/440 |
| 2007/0132767 | A1* | 6/2007 | Wright et al. | 345/475 |
| 2007/0171716 | A1* | 7/2007 | Wright et al. | 365/185.12 |
| 2007/0180522 | A1* | 8/2007 | Bagnall | 726/22 |
| 2007/0214141 | A1* | 9/2007 | Sittig et al. | 707/7 |
| 2007/0250791 | A1* | 10/2007 | Halliday et al. | 715/808 |
| 2007/0261071 | A1* | 11/2007 | Lunt et al. | 725/13 |
| 2009/0100339 | A1* | 4/2009 | Wharton-Ali et al. | 715/720 |

FOREIGN PATENT DOCUMENTS

| | | |
|---|---|---|
| JP | 11-066049 | 3/1999 |
| JP | 11-249640 | 9/1999 |
| JP | 2004-328265 | 11/2004 |

* cited by examiner

FIG. 2

| CHRONOLOGY ID | TITLE | ENTRY ID |
|---|---|---|
| 0001 | LIFE CHRONOLOGY | 1001, 1002, 1003, …,1053, …,1101, 1102, … |
| 0051 | TOY CHRONOLOGY | 0524, 0525, 0526, … |
| 0053 | DEVELOPMENT CHRONOLOGY | 0081, 0082, 0083, … |
| … | … | … |

FIG. 3

| ENTRY ID | DATE INFORMATION | TITLE | FILE NAME OF ENTRY | FILE NAME OF CONTENT | TAG |
|---|---|---|---|---|---|
| 1001 | 5. 15. '57 | BIRTH | 1001.JPEG | — | BIRTH, SHINJUKU, SHIMO-OCHIAI, X HOSPITAL |
| 1002 | ‥‥'57 | TOKIWA APARTMENT | 1002.JPEG | — | TOKIWA APARTMENT, COMICS |

FIG. 4

| CHRONOLOGY ID | HEAD YEAR | ZOOM LEVEL | RELATED CHRONOLOGY | DATA FOR DISPLAYING DIGEST ||||
| --- | --- | --- | --- | --- | --- | --- | --- |
| | | | | STARTING YEAR | ENDING YEAR | STARTING ZOOM LEVEL | ENDING ZOOM LEVEL | CONTROL INSTRUCTION INFORMATION |
| 0001 | 1983 | 3 YEARS | NONE | 1983 | 1993 | 3 YEARS | 2 YEARS | ..... |

FIG. 5

| CHRONOLOGY ID | RELATED CHRONOLOGY | | OPERATED CHRONOLOGY | DISPLAYED YEAR | ZOOM LEVEL | SELECTED ENTRY | OTHER INPUT INFORMATION |
| --- | --- | --- | --- | --- | --- | --- | --- |
| | 1 | 2 | | | | | |
| 0001 | 0053 | — | 0001 | 1983 | 3 YEARS | — | |
| | | | 0001 | 1986 | 3 YEARS | — | |
| | | | 0001 | 1990 | 5 YEARS | 1109 | |
| | | | ... | ... | ... | ... | ... | ize
CHRONOLOGY PROVIDING METHOD, CHRONOLOGY PROVIDING APPARATUS, AND RECORDING MEDIUM CONTAINING CHRONOLOGY PROVIDING PROGRAM

CROSS REFERENCES TO RELATED APPLICATIONS

The present invention contains subject matter related to Japanese Patent Application JP 2007-009708 filed in the Japanese Patent Office on Jan. 19, 2007, the entire contents of which are incorporated herein by reference.

BACKGROUND OF THE INVENTION

1. Field of the Invention

The present invention relates to a method, an apparatus, and a recording medium containing a program which are used to provide chronologic information provided via various networks to a user.

2. Description of the Related Art

In recent years, attempts have been made to organize various information in various forms so that the information can be efficiently used, in accordance with the spread of information processing apparatuses for personal use, such as personal computers. For example, attempts have been made to use various information in a chronology form.

For example, Patent Document 1 (Japanese Unexamined Patent Application Publication No. 2004-328265) discloses a technique for efficiently displaying many images on one screen at the same time. In this technique, a plurality of images are stored while adding times related to the respective images thereto, a time axis is set on the screen, and the respective images are placed near the positions on the time axis corresponding to the times added to the images, so that the images can be displayed in the order and space corresponding to the times.

On the other hand, Patent Document 2 (Japanese Unexamined Patent Application Publication No. 11-066049) discloses a technique about a chronology display system enabling a personal user to easily create a personal history with low cost. Furthermore, Patent Document 3 (Japanese Unexamined Patent Application Publication No. 11-249640) discloses a technique about a document display apparatus capable of displaying one or more pieces of document data along a time axis and adjusting a display start number of an event constituting each document (serial number) in accordance with a condition given from the outside.

The techniques described in Patent Documents 1 to 3 enable organization and use of various information based on a time axis (enable organization of various information in a chronology form and use thereof). In those techniques, various information can be efficiently managed and used by using a time axis, compared to a case where respective pieces of information are dealt with independently.

SUMMARY OF THE INVENTION

A chronology (a series of chronologic information) created in a personal computer of a user by using the techniques described in Patent Documents 1 to 3 is managed by being stored in a storage device of the personal computer. Also, the chronology may be stored in a server apparatus on the Internet so that various personal users can use it. Of course, the chronology may be shared by a specific user accumulated in a storage device on a local network.

The created chronology is used by being displayed on a display of a personal computer of a user, for example. FIG. 9 illustrates a display example of a chronology. In the example illustrated in FIG. 9, a year bar 11 indicating years of the displayed chronology, a life chronology 12 about a personal history of a user, and a toy chronology 13 are displayed on a display screen 10.

In the life chronology 12, a title 12T of the life chronology 12 and a close icon 12C selected to close the life chronology 12 are displayed. Also, an age bar 12A indicating the ages of the user in the life chronology 12 and item information (hereinafter referred to as entry) EN1(1) and EN1(2), such as thumbnail images corresponding to the respective ages, are displayed. In the toy chronology 13, a title 13T of the toy chronology 13, a close icon 13C selected to close the toy chronology 13, and entries EN2(1), EN2(2), and EN2(3) corresponding to the respective years are displayed.

In the displayed life chronology 12 and the toy chronology 13, the chronology can be scrolled in an earlier-date direction by operating a scroll button 10a, which is a part of a slide bar unit provided at the left edge of the display screen 10. The chronology can be scrolled in a later-date direction by operating a scroll button 10c. By operating a scroll bar 10b in the slide bar unit, the chronology can be scrolled in a moving direction of the scroll bar 10b.

When such a chronology is displayed, it is typical that the chronology is displayed from its head. Then, a user scrolls the displayed chronology to see various information arranged along the time axis and recognizes the content of the chronology in time series. However, a creator of the chronology may want the user to read the chronology from a midpoint or the end of the chronology by retracing the years, depending on the type and content of the chronology.

For example, in the life chronology 12 illustrated in FIG. 9, it may be better for understanding the person to read the chronology from university days or days after being got employed, when he/she acts with individuality and has many topics, and then return to earlier days as necessary, than to read the chronology from the birth, when only a small amount of information is provided. On the other hand, in the toy chronology 13 illustrated in FIG. 9, since the user of this chronology knows present circumstances of toys, it may be better for easily understanding transition of toys to read the chronology from present days toward earlier days.

Furthermore, in a chronology of a historical character, for example, the user may want to overview a digest of the chronology, mainly the year when an event as a so-called turning point occurred. Also, the user may want to review the content of a chronology after reading the chronology by scrolling it.

As described above, there has been a demand for enabling a user to use a created chronology by displaying it in various forms without troubling the user.

In view of the above-described circumstances, the present invention is directed to enabling use of a created chronology (a series of chronologic information) by displaying it in a manner desired by a creator or a user of the chronology.

According to an embodiment of the present invention, there is provided a method for providing chronologic information that is generated by placing one or more pieces of related information according to information about elapsed time. The method includes the steps of obtaining, by obtaining means, (i) basic information associating pieces of the related information with the information about time indicating positions on the chronologic information and (ii) information indicating a display form of the chronologic information; and providing, by control means, the chronologic information to a user by displaying the chronologic information in display means based on the information indicating a display form of the chronologic information by using the basic information.

According to this method, a series of chronologic information includes basic information including thumbnail images constituting the content of a chronology, related information such as text data, and information about time indicating positions on the chronology of the related information. In addition to the basic information of the chronology, information indicating a display form of the chronology (a series of chronologic information) is obtained by the obtaining means.

The chronology including the obtained basic information is displayed in predetermined display means under control of the control means. In that case, the information indicating a display form is used by the control means, and the chronology including the basic information is displayed in a form (pattern) according to the information indicating a display form.

The information indicating a display form is generated by a creator of the chronology so that the chronology is displayed (presented) according to the intention of the creator, or is generated by a user of the chronology so that the chronology is displayed according to the intention of the user, or is generated in an apparatus (system) displaying the chronology based on basic information and so on.

Accordingly, the chronology can be displayed from its head or from a midpoint, or the chronology can be displayed from its end so that the user can trace the past years. Also, pieces of information of arbitrary points in the chronology can be sequentially displayed along a time axis. In this way, the chronology can be provided in various forms.

According to the above-described configuration, a chronology created by arranging various pieces of related information on a time axis can be displayed from its head. Also, the chronology can be displayed (presented) in various forms according to the intention of a creator, a user, or a system and can be used.

BRIEF DESCRIPTION OF THE DRAWINGS

FIG. 2 illustrates an example of a configuration of a chronology table;

FIG. 3 illustrates an example of a configuration of an entry table;

FIG. 4 illustrates an example of a configuration of initial display form information (initial display form table);

FIG. 5 illustrates an example of a configuration of operation state history information (operation state history table);

DESCRIPTION OF THE PREFERRED EMBODIMENTS

Hereinafter, a method, an apparatus, and a recording medium containing a program according to an embodiment of the present invention are described with reference to the drawings.

Configuration of Chronology Providing Apparatus

Figure 1:
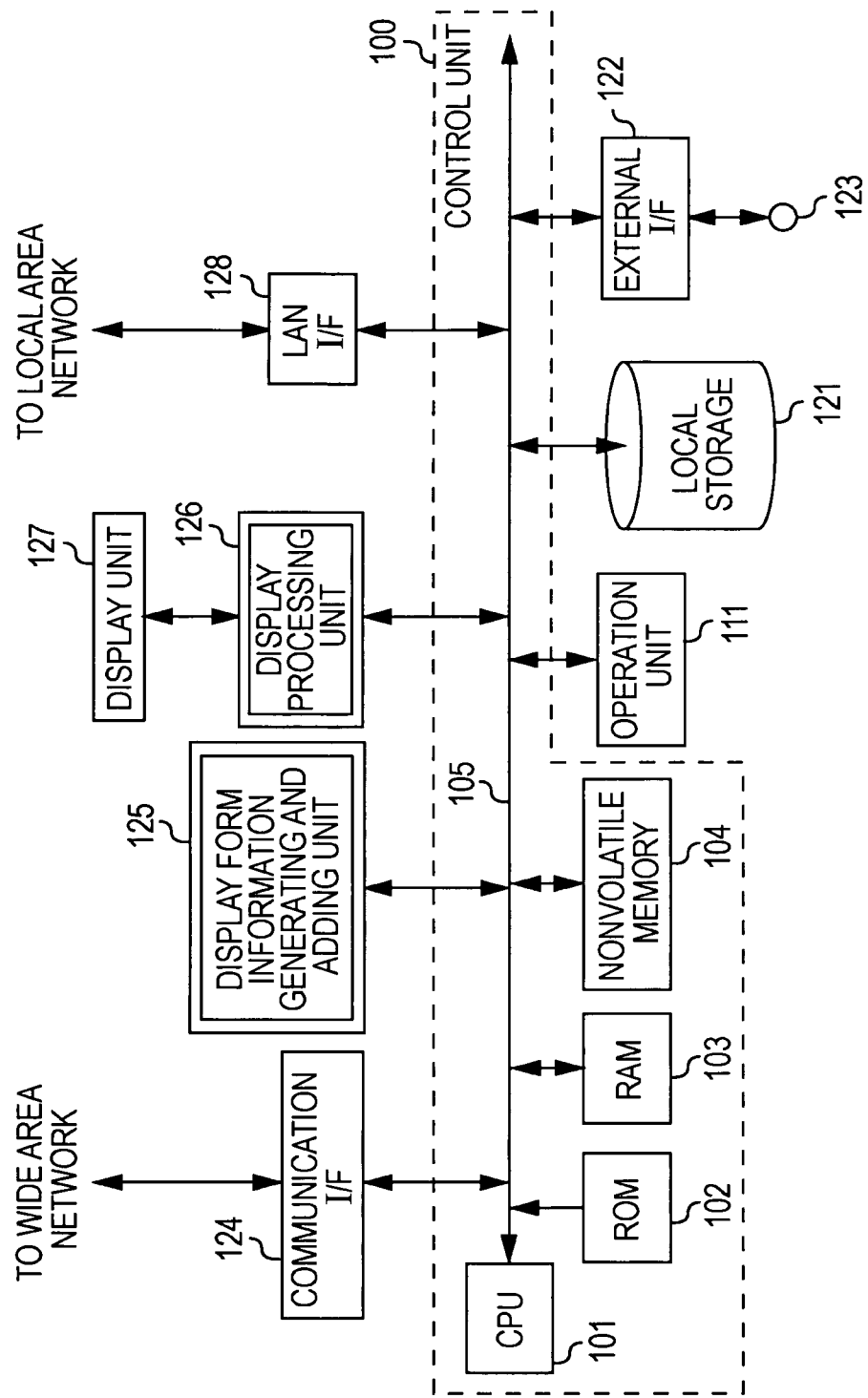
FIG. 1 is a block diagram illustrating a chronology providing apparatus according to an embodiment of the present invention.

First, a chronology providing apparatus according to an embodiment of the present invention is described. FIG. 1 is a block diagram illustrating the chronology providing apparatus according to this embodiment. The chronology providing apparatus according to this embodiment is realized by a personal computer or the like and is installed in a house and is used there.

The chronology providing apparatus according to this embodiment realizes a function of obtaining an already-created chronology (a series of chronologic information) and displaying the chronology to provide it to a user. Also, the chronology providing apparatus is capable of creating a new chronology by accepting input of thumbnail images, related information including text information, and information about time to create the chronology, and is also capable of generating information indicating a display form of an existing chronology (a series of chronologic information) and adding the information to the existing chronology in accordance with instructions from a user or a system.

As illustrated in FIG. 1, the chronology providing apparatus according to this embodiment includes a control unit 100, an operation unit 111, a local storage 121, an external interface (hereinafter referred to as an external I/F) 122, an external input/output terminal 123, a communication interface (hereinafter referred to as a communication I/F) 124, a display form information generating and adding unit 125, a display processing unit 126, a display unit 127, and a LAN (local area network) interface (hereinafter referred to as a LAN I/F) 128.

The control unit 100 controls each unit of the chronology providing apparatus according to this embodiment. As illustrated in FIG. 1, a CPU (central processing unit) 101, a ROM (read only memory) 102, a RAM (random access memory) 103, and a nonvolatile memory 104 such as a flash memory or an EEPROM (electrically erasable and programmable ROM) are mutually connected via a CPU bus 105 so as to constitute a microcomputer.

As described below, the CPU 101 plays a predominant roll in control: executes a program stored in the ROM 102, generates control signals and supplies them to the respective units, and receives and processes signals from the respective units. The ROM 102 stores various programs executed in the CPU 101 and various data used in processes.

The RAM 103 is mainly used as a work area and temporarily stores an intermediate result of a process. The nonvolatile memory 104 stores data that should be stored even after the power of the chronology providing apparatus of this embodiment is turned off, for example, various setting parameters, newly provided programs for expanding a function, other various data, and processing results.

The operation unit 111 includes a keyboard provided with alphabet keys, numeric keys, and various function keys, and a pointing device such as a mouse or a trackball. The operation unit 111 receives input of various operations from a user, converts the input to an electric signal, and supplies the signal to the control unit 100. Accordingly, the control unit 100 controls the respective units in accordance with input of operations from the user so as to perform a process desired by the user.

The chronology providing apparatus according to this embodiment obtains various chronologies released on a wide area network such as the Internet, various chronologies released on a predetermined local area network, chronologies accumulated in the local storage 121 of the apparatus, and chronologies stored in an external apparatus connected via the external I/F 122 and the external input/output terminal 123, and displays the chronologies on a display screen of the display unit 127 so that a user can use (view) them.

That is, in the chronology providing apparatus according to this embodiment, the control unit 100 controls the communication I/F 124 and obtains various pieces of content including a chronology from a predetermined server on a wide area network such as the Internet, in accordance with input of instructions accepted from the user via the operation unit 111. The content is temporarily stored in the RAM 103 or stored in the local storage 121 via the control unit 100, so that the user can use the content in the chronology providing apparatus.

Also, in the chronology providing apparatus according to this embodiment, the control unit 100 controls the LAN I/F 128 and obtains various pieces of content including a chronology from various information apparatuses connected to a predetermined local area network, in accordance with input of instructions accepted from the user via the operation unit 111. The content is temporarily stored in the RAM 103 or stored in the local storage 121 via the control unit 100, so that the user can use the content in the chronology providing apparatus.

Furthermore, in the chronology providing apparatus according to this embodiment, the control unit 100 obtains various pieces of content including a chronology from an external apparatus connected via the external I/F 122 and the input/output terminal 123, in accordance with input of instructions accepted from the user via the operation unit 111. The content is temporarily stored in the RAM 103 or stored in the local storage 121 via the control unit 100, so that the user can use the content in the chronology providing apparatus.

In the chronology providing apparatus according to this embodiment, the external I/F 122 and the external input/output terminal 123 correspond to a so-called digital interface, such as a USB (universal serial bus) or a digital bus of the IEEE (Institute of Electrical and Electronics Engineers) 1394 standard.

As described above, the chronology providing apparatus according to this embodiment can create a chronology. Specifically, in accordance with input of instructions accepted from the user via the operation unit 111, the chronology providing apparatus can obtain necessary information from a server on the wide area network via the communication I/F 124, from an information apparatus on the local area network via the LAN I/F 128, or from an external apparatus connected via the external I/F 122 and the input/output terminal 123, create a chronology by adding information about time to the obtained information, and store the chronology in the local storage 121, so that the chronology can be used.

Of course, the chronology stored in the local storage 121 can be transferred to a server apparatus on the Internet via the communication I/F 124 and released in the server apparatus. Also, the chronology stored in the local storage 121 can be transferred to an information apparatus on a predetermined local area network via the LAN I/F 128 so that the chronology can be shared by users capable of accessing the local area network.

The local storage 121 can be configured by using various types of storage, e.g., a magnetic disk such as a hard disk, an optical disc such as a DVD (digital versatile disc), an MO (magneto-optical) disk, and a semiconductor memory. Note that, in this embodiment, a hard disk capable of realizing large capacity at relatively low cost and high access speed is used as the local storage 121.

As described above, in the chronology providing apparatus according to this embodiment, the chronology obtained from the server apparatus on the wide area network via the communication I/F 124, the chronology obtained from the information apparatus on the local area network via the LAN I/F 128, the chronology obtained from the external apparatus via the external I/F 122 and the input/output terminal 123, or the chronology read from the local storage 121 is supplied to the display processing unit 126 via the control unit 100.

The display processing unit 126 generates video signals for displaying images on the display screen of the display unit 127 based on the chronology (a series of chronologic information) supplied thereto in accordance with the control of the control unit 100, and supplies the video signals to the display unit 127. Accordingly, the images corresponding to the chronologic information read from the local storage 121 by the control unit 100 and the chronologic information temporarily stored in the RAM 103 are displayed on the display screen of the display unit 127.

The display unit 127 includes a display device, such as an LCD (liquid crystal display), an organic EL (electroluminescence) panel, a PDP (plasma display panel), or a CRT (cathode ray tube), and a control circuit therefor.

The display unit 127 is capable of receiving video signals from the display processing unit 126 and displaying images corresponding to the video signals on the display screen of the display device.

According to the related art, a chronology is typically displayed from its head. On the other hand, in the chronology providing apparatus according to this embodiment, a chronology can be displayed from a position other than the head, or so-called digest display can be performed by displaying only a specific part of the chronology, or a unit period (hereinafter referred to as a zoom level) of the chronology displayed on a screen can be changed, in accordance with information indicating a display form of the chronology.

Here, the information indicating a display form of a chronology (display form information) may be provided while being originally attached to the chronology when the chronology is obtained from the outside, e.g., from a server apparatus on the Internet. In that case, the control unit 100 can control the display processing unit 126 in accordance with the attached display form information and can display the chronology on the display screen of the display unit 127 in a form (pattern) according to the display form information.

Also, the chronology providing apparatus according to this embodiment includes the display form information generating and adding unit 125, as illustrated in FIG. 1. With this configuration, the display form information generating and adding unit 125 can generate display form information and add the information to a target chronology in accordance with input of an operation accepted from the user via the operation unit 111. Alternatively, the control unit 100 can analyze a series of chronologic information, automatically generate display form information based on the analysis result, and add the information to the chronology.

As described below, the display form information includes initial display form information, which is generated by a creator of the chronology in advance, and operation state history information, which is generated in accordance with an operation of a viewer of the chronology in the chronology providing apparatus and which is stored in the local storage 121 of the chronology providing apparatus. The former is obtained together with chronologic information (basic information to create the chronology) or is generated and added by the function of the display form information generating and adding unit 125 in the chronology providing apparatus, as described above.

The display form information generating and adding unit 125 is capable of generating operation state history information based on input of an operation to the chronology accepted from the user via the operation unit 111 and storing the generated information in the local storage 121.

As described above, in the display form information automatically generated by the display form information generating and adding unit 125 under control of the control unit 100, the initial display form information is generated by analyzing a series of chronologic information forming the chronology and determining the years where many entries, such as thumbnail images, exist (the years of high information density) and the years where a few entries exist (the years of low information density). Accordingly, display of the chronology can be started from the years of high information density. Alternatively, the years of low information density can be skipped and only the years of high information density can be displayed. On the other hand, the operation state history information is generated by the display form information generating and adding unit 125 in accordance with input of an operation accepted via the operation unit 111, as described above.

Referring to FIG. 1, the functions of the display form information generating and adding unit 125 and the display processing unit 126 surrounded by double lines can be realized by software executed in the control unit 100. In other words, the control unit 100 may have the functions of the display form information generating and adding unit 125 and the display processing unit 126.

Example of Configuration of Basic Information of Chronology

Next, an example of a configuration of basic information of a chronology (a series of chronologic information) used in the chronology providing apparatus according to this embodiment is described. In this embodiment, basic information of a chronology includes two tables: a chronology table and an entry table. FIG. 2 illustrates an example of a configuration of the chronology table, and FIG. 3 illustrates an example of a configuration of the entry table.

The chronology table illustrated in FIG. 2 is a table to manage information of an entire chronology and includes chronology IDs as identification information of respective chronologies, titles of the respective chronologies, and entry IDs identifying entries, such as thumbnail images and text information, forming the respective chronologies.

In this embodiment, the chronology ID is a unique four-digit number assigned to each chronology, and the title is a name (character information) given to each chronology, e.g., "life chronology", "toy chronology", or "development chronology". The entry ID is a unique four-digit number given to each entry. With those pieces of information, the titles and entries of the chronologies each being specified by a chronology ID can be identified.

The information of the chronology table, including the chronology IDs, the titles, and the entry IDs, can be provided in units of chronologies.

The entry table illustrated in FIG. 3 is a table to manage specific information about respective entries forming each chronology and includes, as illustrated in FIG. 3, entry IDs, date information, titles, file names of entries, file names of content, and tag information.

The entry ID is a unique four-digit number assigned to each entry, as described above. The date information is information indicating the position in the chronology of the entry (information about time indicating the position in the chronology), and is represented by eight digits: four digits of Christian year (upper two digits are omitted in FIG. 3); two digits of month; and two digits of date.

The date information can be set roughly or in detail, for example, only the Christian year or the month and the Christian year may be set, or hour, minute, and second can be added. In this way, the date information can be set with appropriate accuracy in accordance with the span of the chronology to be created.

The title is a name (character information) given to each entry, e.g., "birth" and "tokiwa apartment". The file name of entry is information to specify the file storing the entry. The file name of content is information to specify the file storing content, such as image information or music information, related to the entry (the related content does not necessarily exist). The tag is character information given to each entry.

The entry table including the entry IDs, the date information, the titles, the file names of entries, the file names of content, and the tags can be provided in units of chronologies, each including entries forming the chronology.

Figure 9:
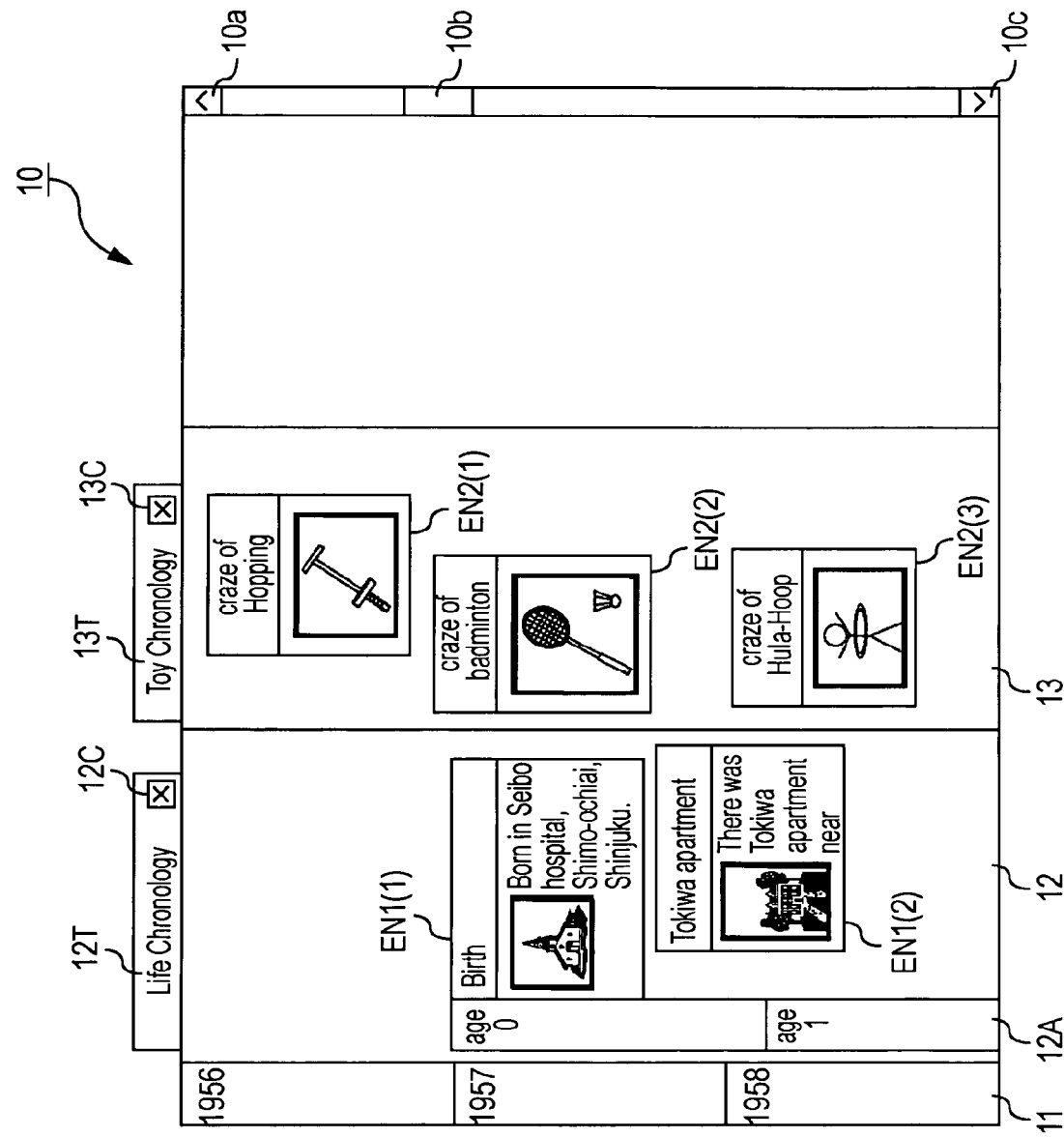
FIG. 9 illustrates a display example (display form) according to a related art.

As can be understood from FIGS. 2 and 3, the entries included in a chronology can be determined by specifying the chronology. In order to create and display a chronology, a creator refers to the entry table illustrated in FIG. 3 in accordance with the entry IDs in the chronology table illustrated in FIG. 2, specifies the file names of desired entries, reads the entries from the files, and arranges the entries in accordance with the date information of the entry table illustrated in FIG. 3. Accordingly, the creator can create a desired chronology, e.g., the life chronology 12 or the toy chronology 13 illustrated in FIG. 9, and display the chronology from its head.

Display Form Information

By using the chronology table and the entry table illustrated in FIGS. 2 and 3 serving as basic information of chronologies, a chronology can be displayed from its head and can be used by scrolling the chronology in accordance with input of an operation by a user.

However, the user may want to display the chronology in a new form different from that of the related art in order to use the chronology more effectively. For example, the user may want to display the chronology from a position other than its head in accordance with the intention of the creator of the chronology, display a digest so as to overview the chronology, or redisplay the chronology once-displayed and used by scrolling it in the same form.

For those demands, this embodiment enables the user to display and use a chronology in a new form by providing display form information in addition to information of the chronology table and the entry table serving as minimum required basic information to create a chronology. In this embodiment, the display form information includes (1) initial display form information (data indicating an initial display form) and (2) operation state history information (data indicating an operation state of user).

(1) Initial display form information includes (1-1) data indicating the year to be displayed first, (1-2) data indicating the zoom level of the years to be displayed first, (1-3) data indicating a related chronology to be displayed at the same time, and (1-4) data for displaying a digest showing an overview of the chronology.

(1-4) Data for displaying a digest showing an overview of the chronology includes (1-4-1) data indicating the starting year of the digest, (1-4-2) data indicating the ending year of the digest, (1-4-3) data indicating the starting zoom level of the digest, (1-4-4) data indicating the ending zoom level of the digest, and (1-4-5) history data about a series of operations performed on the chronology, such as scrolling and zooming.

(2) Operation state history information includes (2-1) data indicating the year of the chronology that is presently displayed, (2-2) data indicating the zoom level of the chronology that is presently displayed, and (2-3) data indicating a group of chronologies that are presently displayed (data indicating the chronologies to be displayed at the same time).

Example of Configuration of (1) Initial Display Form Information

FIG. 4 illustrates an example of a configuration of the initial display form information (initial display form table). As illustrated in FIG. 4, the initial display form table in this example includes fields for the following items: chronology ID, head year, zoom level, and related chronology. Also, as the data for displaying a digest, the table includes fields for the following items: starting year, ending year, starting zoom level, ending zoom level, and control instruction information.

A record of information is given to each chronology. The record of information includes the following items: chronology ID, head year, zoom level, and related chronology. Also, as the data for displaying a digest, the record of information includes the following items: starting year, ending year, starting zoom level, ending zoom level, and control instruction information.

The chronology ID is information to specify the chronology to be added with information from the head year to the data for displaying a digest. In the example illustrated in FIG. 4, the initial display form information is added to the chronology having a chronology ID "0001".

The head year corresponds to (1-1) data indicating the year to be displayed first, the zoom level corresponds to (1-2) data indicating the zoom level of the years to be displayed first, and the related chronology corresponds to (1-3) data indicating a related chronology to be displayed at the same time. In the example illustrated in FIG. 4, the head year is "1983", the zoom level is "three years", and the related chronology is "none".

In the information constituting the data for displaying a digest, the starting year corresponds to (1-4-1) data indicating the starting year of the digest, and the ending year corresponds to (1-4-2) data indicating the ending year of the digest. The starting zoom level corresponds to (1-4-3) data indicating the starting zoom level of the digest, and the ending zoom level corresponds to (1-4-4) data indicating the ending zoom level of the digest. The control instruction information corresponds to (1-4-5) history data about a series of operations performed on the chronology, such as scrolling and zooming.

In the example illustrated in FIG. 4, in the information constituting the data for displaying a digest, the starting year is "1983", the ending year is "1993", the starting zoom level is "three years", and the ending zoom level is "two years". Also, the control instruction information exists.

Although the details are described below, a chronology can be displayed in the following manner based on the information of the initial display form table illustrated in FIG. 4. For example, chronologic information of the years specified by the zoom level from the year specified by the head year can be displayed on a display screen 127G. Also, a chronology specified by the related chronology (related chronology) can be automatically displayed in addition to the chronology to be displayed. Also, a digest of the chronology can be displayed in accordance with the data for displaying the digest.

The initial display form table is usually generated by a creator of the chronology. Thus, the chronology can be displayed from a position other than its head or a digest of the chronology can be displayed to overview the chronology, in accordance with the intention of the creator. For this reason, as the information of the initial display form table, chronology ID, head year, zoom level, related chronology, and data for displaying a digest are provided as a set of information together with the basic data of the chronology to be displayed.

When the chronology has a large amount of information, the control unit 100 of the chronology providing apparatus according to this embodiment can analyze the basic information of the chronology, and the year having the largest number of entries can be set as the head year to be displayed first. Alternatively, the zoom level can be set in accordance with the entire period of the chronology or the period from the starting year to the ending year. Also, a plurality of years having many entries can be specified in the chronology, data for displaying a digest can be automatically generated so that only the specified years are sequentially displayed, and the digest can be displayed.

Example of Configuration of (2) Operation State History Information

FIG. 5 illustrates an example of a configuration of the operation state history information (operation state history table). As illustrated in FIG. 5, the operation state history table of this example includes the following items: chronology ID, related chronology, operated chronology, displayed year, zoom level, selected entry, and other input information.

For the table illustrated in FIG. 5, information according to input of operations to a chronology accepted via the operation unit 111 is accumulated in the local storage 121, for example, of the chronology providing apparatus after the chronology has been displayed until the display thereof ends. That is, in the operation state history table illustrated in FIG. 5, the entire information in the table is information about the displayed chronology, unlike in the initial display form table illustrated in FIG. 4.

In this table, the chronology ID is information to specify the displayed table, and the related chronology is information to specify a chronology displayed together with the displayed chronology. The chronology ID and the related chronology correspond to the above-described (2-3) data indicating a group of chronologies that are presently displayed (data indicating the chronologies to be displayed at the same time). In this example, one or two chronologies can be specified as related chronologies to be displayed together with the displayed chronology.

The operated chronology is information to specify a chronology operated by the user in a case where a plurality of chronologies are displayed and each of the chronologies can be independently operated. The displayed year corresponds to (2-1) data indicating the year of the chronology that is presently displayed, and the zoom level corresponds to (2-2) data indicating the zoom level of the chronology that is presently displayed.

The selected entry is information to specify an entry selected to display specific information. The other input information includes various input information (operation information) of the chronology accepted via the operation unit 111, e.g., a scrolling speed and information of a drag operation of the mouse.

In the example illustrated in FIG. 5, the displayed chronology is the chronology having the chronology ID "0001", and the chronology displayed together as a related chronology is the chronology having the chronology ID "0053". In the example illustrated in FIG. 5, the operated chronology is the chronology having the chronology ID "0001" as indicated by the operated chronology. Also, as indicated by the displayed year, three years "1983", "1986", and "1990" are specified as chronologic positions, and the zoom levels are "three years", "three years", and "five years", respectively. Furthermore, in the example illustrated in FIG. 5, the selected entry indicates that the entry having the entry ID "1109" is selected for the year "1990".

That is, according to the information contained in the operation state history table illustrated in FIG. 5, the two chronologies having the chronology IDs "0001" and "0053" are displayed. In the chronology having the chronology ID "0001", the chronologic information about 1983 to 1985 is displayed first, then the chronologic information about 1986 to 1988 is displayed, and then the chronologic information about 1990 to 1994 is displayed. Also, the entry having the entry ID "1109" is selected while the information about 1990 to 1994 is displayed.

In this example, the user performs an operation on the chronology having the chronology ID "0001". The display of the chronology having the chronology ID "0053", which is displayed together with the chronology having the chronology ID "0001", may be changed in synchronization with the chronology having the chronology ID "0001". Alternatively, the chronology having the chronology ID "0001" and that having the chronology ID "0053" can be independently operated.

In this embodiment, information of the operated chronology is provided in view of the case where a plurality of chronologies are displayed at the same time and the respective chronologies can be independently operated. However, in a case where only one chronology is displayed or a case where a plurality of chronologies are displayed, one of which being able to be operated and the display of the others (related chronologies) being able to be changed in synchronization with an operated chronology, the operated chronology, which is the information to distinguish the operated chronology, does not need to be recognized. In a chronology where an entry is not selected, the item of the selected entry does not need to be used.

Although the details are described below, the user of the chronology providing apparatus according to this embodiment can display and use a once-used chronology in the chronology providing apparatus repeatedly in a previously-used form, based on the information in the operation state history table illustrated in FIG. 5.

Display Example of Chronology Using Display Form Information

Next, a display example in a case where a chronology is displayed by using the display form information described above with reference to FIGS. 4 and 5 is described in detail.

Figure 6:
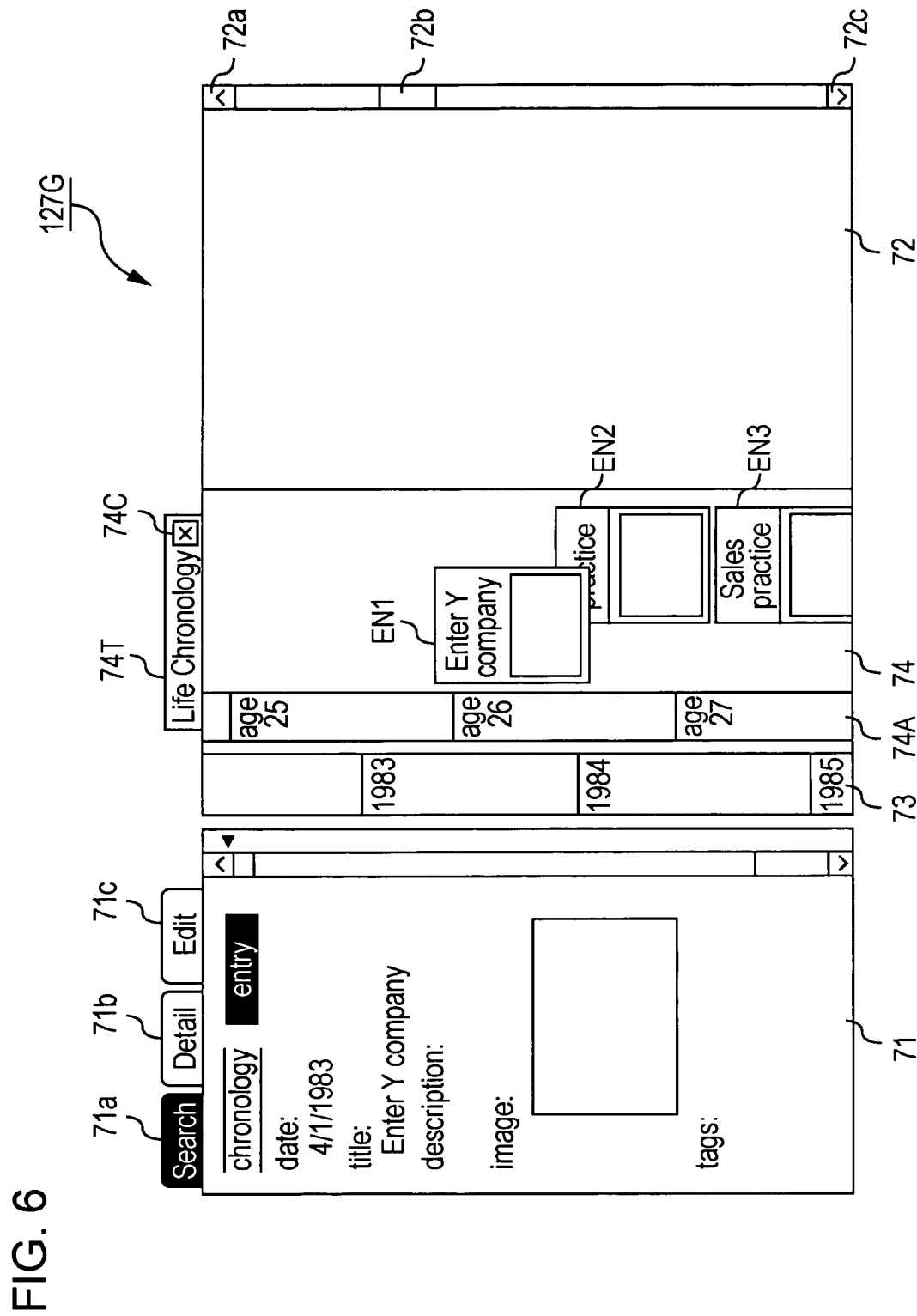
FIG. 6 illustrates a display example of a chronology when data of the year to be displayed first in the chronology exists as display form information.

FIG. 6 illustrates a display example of a chronology in a case where data of the year that should be displayed first in the displayed chronology is provided as display form information. Hereinafter, descriptions are made based on the assumption that a chronology formed by basic information including the chronology table illustrated in FIG. 2 and the entry table illustrated in FIG. 3 is provided, and that this chronology has the chronology ID "0001" and is the life chronology illustrated as the chronology 12 in FIG. 9.

Also, it is assumed that, in the life chronology having the chronology ID "0001", initial display form data registered in the initial display form table exists, as described above with reference to FIG. 4. If the initial display form data does not exist, the life chronology is displayed in the manner illustrated in the chronology 12 in FIG. 9. That is, the chronology is displayed from its head, in other words, from the birth of the person whose history is described in the life chronology.

However, as described above with reference to FIG. 4, if the chronology has data registered in the initial display form table, the chronology can be displayed in accordance with the data registered in the initial display form table. More specifically, as illustrated in FIG. 4, the life chronology having the chronology ID "0001" has the information "1983" as the head year, has the information "three years" as the zoom level, and does not has information of a related chronology. Thus, the chronology is displayed from "1983" with a zoom level of three years, as illustrated in FIG. 6.

As illustrated in FIG. 6, when a chronology is displayed on the display screen 127G of the display unit 127 in the chronology providing apparatus according to this embodiment, a first area (window) 71 to input and display information about a chronology or an entry of the chronology and a second area (window) 72 to display a chronology are provided.

The first area 71 is provided with tabs to provide instructions about the usage form of the first area 71: a search tab 71a, a detail tab 71b, and an edit tab 71c. These tabs can be selected by using the mouse of the operation unit 111, and a selected tab is highlighted so that the user can recognize the tab has been selected. In the example illustrated in FIG. 6, the search tab 71a is selected.

Also, a chronology tab to provide instructions to perform a process on a chronology and an entry tab to provide instructions to perform a process on an entry are provided in the first area 71. In the example illustrated in FIG. 6, the entry tab is selected.

When the search tab 71a is selected, the first area 71 can be used to search for a chronology or an entry. When the detail tab 71b is selected, the first area 71 can be used to display specific information about a chronology or an entry. When the edit tab 71c is selected, the first area 71 can be used to edit information about a chronology or an entry.

On the other hand, a chronology selected through a search in the first area 71 is displayed in the second area 72. For this purpose, the second area 72 is larger than the first area 71. In this embodiment, the second area 72 is twice as large as the first area 71, and at least two chronologies can be displayed there at the same time.

In the example illustrated in FIG. 6, a year bar 73 indicating the displayed years is provided at the left edge of the second area 72. The specified part of the life chronology is displayed on the right side of the year bar 73. In the life chronology 74, an age bar 74A indicating the ages of the person of the life chronology is displayed, and entries EN1, EN2, EN3, . . . corresponding to the ages are also displayed, as illustrated in FIG. 6.

Also, a title display field 74T to indicate the title of the displayed chronology is provided at the upper edge of the life chronology 74, and a close icon 74C to close the chronology is displayed at the right edge of the title display field 74T.

A slide bar unit is provided at the right edge of the second area 72. By operating a scroll button 72a as a part of the slide bar unit, the chronology can be scrolled in an earlier-day direction. By operating a scroll button 72c, the chronology can be scrolled in a later-day direction. By operating a scroll bar 72b of the slide bar unit, the chronology can be scrolled in accordance with a movement direction of the scroll bar 72b.

As described above, in this example, the head year is "1983" and the zoom level is "three years" in accordance with the information in the initial display form table illustrated in FIG. 4. Thus, as illustrated in FIG. 6, the control unit 100 of the chronology providing apparatus sets the head to "1983" and the zoom level to "three years". That is, the life chronology having the chronology ID "0001" as a display target is displayed on the display screen 127G of the display unit 127 via the display processing unit 126, with a unit period of the chronology displayed on one screen being set to three years.

In the example illustrated in FIG. 6, the head-year is positioned at substantially the center in the vertical direction of the second area 72. With this display form, information about the years around the head year can also be viewed. Of course, the head year can be positioned at the top of the second area 72 and the three years from the head year (e.g., three years from 1983 to 1985 if the head year is 1983) can be displayed.

As described above, with the configuration enabling setting of the head year and zoom level in accordance with the intention of the creator of the chronology, the chronology can be displayed from the year that should be displayed first.

As described above with reference to FIG. 6, if the creator of the life chronology having the chronology ID "0001" wants a user to mainly view the life after he/she has become a member of society, the creator can make setting so that the chronology is displayed from the year when he/she entered Y company. That is, in the example illustrated in FIG. 6, a read starting point of the chronology is the year 1983, and the chronology is displayed such that the user can clearly understand the life as a member of society began from this year.

In this case, the viewer of the life chronology can read the history of the person of the life chronology from the year when the person became a member of society. That is, the viewer can read the life chronology in both past and future directions.

In the initial display form table described above with reference to FIG. 4, the data for displaying a digest is set for the life chronology having the chronology ID "0001". Based on the data for displaying a digest, the chronologic information of the eleven years from 1983 to 1993 can be displayed as a digest with a starting zoom level of three years and an ending zoom level of two years.

More specifically, the digest is displayed in the following manner. The chronologic information of the three years from 1983 to 1985 is displayed for predetermined time, then the chronologic information of the three years from 1986 to 1988 is displayed for predetermined time, then the chronologic information of the three years from 1989 to 1991 is displayed for predetermined time, and finally the chronologic information of the two years from 1992 to 1993 is displayed for predetermined time. In this case, the display time of each period and the timing to change the zoom level are provided as the control instruction information in the data for displaying the digest.

As illustrated in FIG. 4, in the chronology having the data for displaying a digest, the digest of the chronology is displayed first based on the data and then the chronology is displayed based on the information in the initial display form table, including the head year, the zoom level, and the related chronology.

In this way, if the creator generates the initial display form table illustrated in FIG. 4 at creation of a chronology, a digest of the chronology can be displayed or the chronology can be displayed from a desired year as the head year. That is, the chronology can be displayed in a form according to the intention of the creator so as to provide the chronology to a viewer (user).

Figure 7:
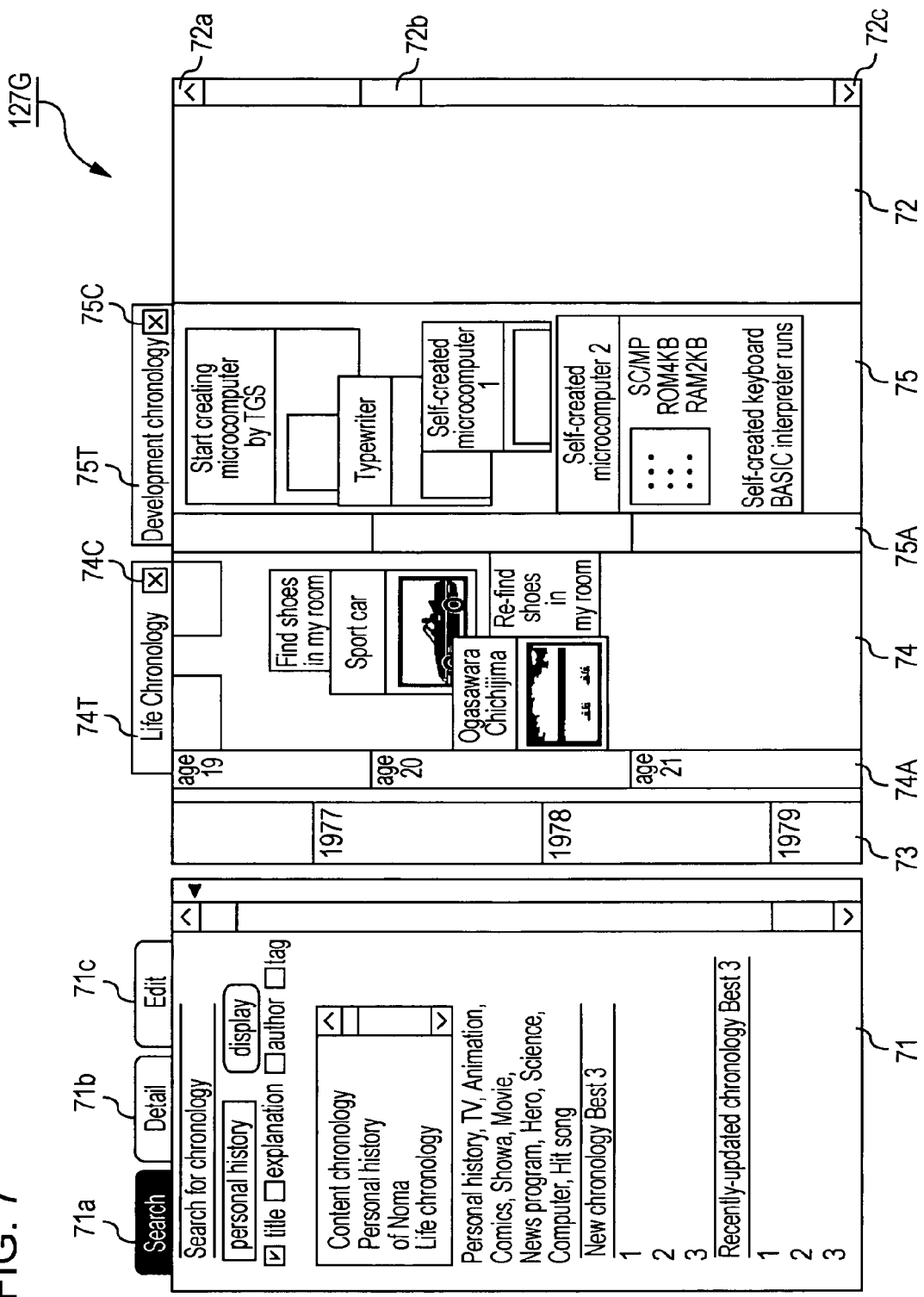
FIG. 7 illustrates a display example when chronologies to be displayed at the same time are specified as the display form information.

FIG. 7 illustrates a display example in a case where chronologies to be displayed at the same time are specified as display form information. Hereinafter, descriptions are given based on the assumption that chronologies formed by basic information including the chronology table described above with reference to FIG. 2 and the entry table described above with reference to FIG. 3 are provided, and that a life chronology having the chronology ID "0001" and a development chronology having the chronology ID "0053" are displayed.

As described above, initial display form data registered in the initial display form table exists in the life chronology having the chronology ID "0001", as described above with reference to FIG. 4. Although no related chronology is registered in the example illustrated in FIG. 4, it is assumed that the development chronology having the chronology ID "0053" is registered as a related chronology in this example.

That is, in this example, the creator of the life chronology having the chronology ID "0001" and the development chronology having the chronology ID "0053" wants a user to display the both chronologies at the same time and view the chronologies by comparing them. Also, the development chronology having the chronology ID "0053" is registered in the field of the related chronology in the initial display form table of the life chronology having the chronology ID "0001".

In such a case, the control unit 100 of the chronology providing apparatus according to this embodiment displays the development chronology having the chronology ID "0053" together with the life chronology having the chronology ID "0001", which is an original display target, based on the information of the related chronology in the initial display form table, as illustrated in FIG. 7.

In FIG. 7, too, as in the example illustrated in FIG. 6, the first area (window) 71 to input and display information about a chronology or an entry of the chronology and the second area (window) 72 to display a chronology are provided when a chronology is displayed on the display screen 127G of the display unit 127.

The first area 71 is provided with the tabs to provide instructions about the usage form of the first area 71: the search tab 71*a*, the detail tab 71*b*, and the edit tab 71*c*. In the example illustrated in FIG. 7, the search tab 71*a* is selected and a chronology can be searched for.

In the second area 72, the life chronology 74 is displayed and also the development chronology 75 having the chronology ID "0053" is displayed at the same time based on the information of the related chronology in the initial display form table about the life chronology. In the example illustrated in FIG. 7, too, the year bar 73 indicating the years of the displayed chronology is provided at the left edge of the second area 72.

As illustrated in FIG. 7, in the life chronology 74, the age bar 74A indicating the ages of the person of the life chronology is displayed and entries corresponding to the ages are also displayed. Likewise, in the development chronology 75, an age bar 75A indicating the ages of the person of the development chronology is displayed and entries corresponding to the ages are also displayed.

Also, the title display field 74T to indicate the title of the displayed chronology is provided at the upper edge of the life chronology 74, and the close icon 74C to close the chronology is displayed at the right edge of the title display field 74T.

Likewise, a title display field 75T to indicate the title of the displayed chronology is provided at the upper edge of the development chronology 75, and the close icon 75C to close the chronology is displayed at the right edge of the title display field 75T.

Furthermore, as in the example described above with reference to FIG. 6, the slide bar unit is provided at the right edge of the second area 72. By operating the scroll button 72*a* of the slide bar unit, the chronology can be scrolled in an earlier-day direction. By operating the scroll button 72*c*, the chronology can be scrolled in a later-day direction. By operating the scroll bar 72*b* of the slide bar unit, the chronology can be scrolled in accordance with a movement direction of the scroll bar 72*b*.

In the display example illustrated in FIG. 7, both the life chronology 74 and the development chronology 75 are displayed with the age 20 as a reference (head). Specifically, the life chronology 74 illustrates that the person experienced impressive big events: got a driver's license and purchased a car; and traveled in Chichijima in Ogasawara. On the other hand, the development chronology 75 illustrates that the person started development of a self-created microcomputer and produced a good result. That is, the user can view these two chronologies at the same time while comparing them and can easily understand the content of the chronologies.

In this way, a creator of a chronology can make setting so that, when the chronology is opened (viewed), another chronology related to the chronology is automatically opened and displayed such that a user can view the both chronologies while comparing them.

In the above-described example, the chronologies are displayed in a form (pattern) according to the intention of the creator of the chronologies, but the present invention is not limited to this example. As described above, a chronology once displayed and used by scrolling it by a viewer of the chronology (a user viewed the chronology via the chronology providing apparatus according to this embodiment) can be displayed in the same form (pattern) again.

In that case, the information in the operation state history table illustrated in FIG. 5 is used. Based on the information in the operation state history table, a chronology as a display target is displayed, and the chronology can be repeatedly displayed in a manner used previously while scrolling the chronology, changing the zoom level, and selecting an entry in accordance with the information in the table: the operated chronology, the displayed year, the zoom level, the selected entry, and the other input information.

If an operation is performed on the displayed chronology while the chronology is displayed in the previously used form, information about the newly performed operation is added to the operation state history table having the configuration illustrated in FIG. 5, and the chronology can be displayed in the form on which the newly performed operation is reflected.

Also, by inputting a displayed year and a zoom level, the initial display form of a target chronology can be specified.

As described above, the operation state history table enables a viewer of a chronology to repeatedly display the chronology satisfying his/her purpose in a desired form (pattern) and use it.

In the chronology providing apparatus according to this embodiment, if the operation state history table exists for a displayed chronology, the chronology is displayed in the form according to the operation state history table. Then, if the data corresponding to the initial display form table exists, the chronology is displayed from the head year based on the data.

On the other hand, if the operation state history table does not exist and if the data corresponding to the initial display form table and the data for displaying a digest exist, a digest is displayed in the form according to the data for displaying a digest. Then, the chronology is displayed from the head year based on the data corresponding to the initial display form table.

If the data corresponding to the initial display form table does not exist, the chronology is displayed from its real head (the earliest year), as in the related art.

Chronology Display Process in Chronology Providing Apparatus

Figure 8:
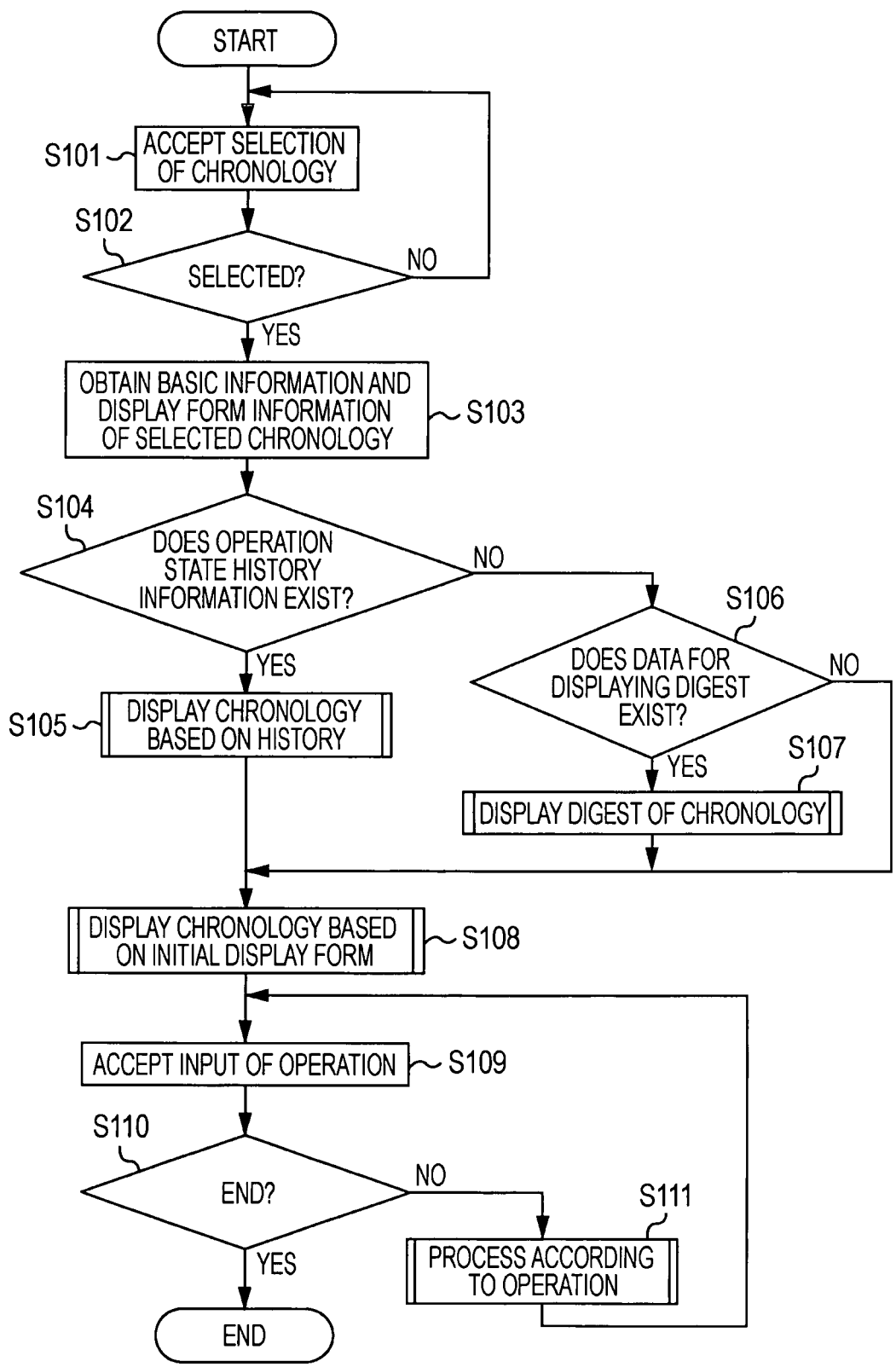
FIG. 8 is a flowchart illustrating a chronology display process performed in the chronology providing apparatus according to the embodiment.

FIG. 8 is a flowchart illustrating a chronology display process performed in the chronology providing apparatus according to this embodiment. Upon receiving instructions to display a chronology input by a user via the operation unit 111 of the chronology providing apparatus according to this embodiment, the control unit 100 performs the process illustrated in FIG. 8.

The control unit 100 controls the display processing unit 126 to display a screen, including the first area 71 and the second area 72 illustrated in FIGS. 6 and 7, for displaying a chronology on the display screen 127G of the display unit 127, and accepts input of necessary information to the first area 71 via the operation unit 111, thereby accepting selection of a chronology to be displayed in accordance with the place where the chronology is stored (step S101). In step S101, a chronology has not been selected. Even if a chronology has been selected, the basic information and the display form information of the chronology have not been obtained. Thus, no chronology is displayed in the second area 72.

Then, the control unit 100 determines whether a user has selected a chronology (step S102). If the control unit 100 determines in step S102 that the user has not selected a chronology, the process returns to step S101 in order to accept selection of a chronology.

If the control unit 100 determines in step S102 that the user has selected a chronology, the control unit 100 obtains the basic information and the display form information of the selected chronology to be displayed (step S103).

For example, if the selected chronology is in a server apparatus on the Internet, the control unit 100 controls the communication I/F 124 to download the basic information and the display form information of the target chronology from the server apparatus and to store the information in the local storage 121 so that the chronology can be immediately used. If the selected chronology is in an information apparatus on a local area network, the control unit 100 controls the LAN I/F 128 to obtain the basic information and the display form information of the target chronology from the information apparatus and to store the information in the local storage 121 so that the chronology can be immediately used.

Also, if the selected chronology is in an external apparatus connected to the input/output terminal 123, the control unit 100 accesses the external apparatus via the external I/F 122 and the input/output terminal 123, obtains the basic information and the display form information of the target chronology from the external apparatus, and stores the information in the local storage 121 so that the chronology can be immediately used. If the selected chronology is stored in the local storage 121, the control unit 100 specifies the chronology so that the chronology can be immediately used.

As described above, the initial display form information in the display form information is generated mainly by a creator of the chronology and is obtainable together with the basic information. On the other hand, the operation state history information is generated in the chronology providing apparatus in accordance with operations of a user of the apparatus and is accumulated in the local storage 121, for example.

Then, the control unit 100 determines whether the chronology to be displayed has the operation state history information (operation state history table), included in the display form information (step S104). If the control unit 100 determines in step S104 that the operation state history information exists, the chronology is displayed in the previously operated form based on the operation state history information (step S105).

If the control unit 100 determines in step S104 that the operation state history information does not exist, the control unit 100 determines whether data for displaying a digest exists in the initial display form information (step S106). If the control unit 100 determines in step S106 that the data for displaying a digest exists, the control unit 100 displays a digest of the chronology by using the data (step S107).

After step S105 or S107, or if it is determined in step S106 that the data for displaying a digest does not exist, the control unit 100 displays the chronology from a position desired by the creator of the chronology based on the head year, zoom level, and related chronology in the initial display form information (step S108).

Then, the control unit 100 accepts input of an operation to the chronology from the user via the operation unit 111 (step S109). Then, the control unit 100 determines whether the accepted operation is end instructions (step S110). If the control unit 100 determines in step S110 that the operation is not end instructions, the control unit 100 performs a process in accordance with the input instructions (step S111), and then the process returns to step S109.

By repeating steps S109 to S111, the user can view and use the chronology while scrolling the chronology and reading specific information by selecting an entry. Also, at this time, the operation state history information (operation state history table) is created and can be used later.

If the control unit 100 determines in step S110 that end instructions have been accepted, the process illustrated in FIG. 8 ends, that is, the chronology display process ends. If any chronology display form information does not exist, the chronology is displayed from its head in step S108 as in the related art.

As described above, in the chronology providing apparatus according to this embodiment, not only a display form according to the related art in which a chronology is displayed from its head, but also the following new display forms can be realized. That is, a digest of a chronology can be displayed in a form desired by the creator of the chronology, a chronology can be displayed from a midpoint, or a chronology can be viewed by automatically displaying (reproducing) the chronology in the same display form repeatedly in accordance with an operation performed by a user of the chronology providing apparatus. In this way, a chronology can be provided in a new form (pattern) different from that of the related art.

That is, when a user of the chronology providing apparatus reads and displays a desired chronology, the chronology can be displayed from an appropriate year and with a desired zoom level, or can be displayed from the year desired by the creator of the chronology to be displayed first. Also, a related chronology to be displayed at the same time can be displayed.

Also, a user can display a digest of a large-volume chronology to recognize the overview thereof, and then view the details of the respective years of the chronology.

After performing an operation on a displayed chronology (e.g., after scrolling the chronology to view another year), the user can hold the present display state and redisplay the chronology in the same state later. That is, after redisplaying a once-viewed chronology in a previously-used display form and viewing the chronology, the user can view another part of the chronology by operating the chronology.

In the chronology providing apparatus according to this embodiment, if the operation state history information exists, the chronology as a display target is redisplayed in a previously-used form in accordance with the operation state history information. If the operation state history information does not exist and if data for displaying a digest is included in the initial display form information, a digest of the chronology is displayed in accordance with the data. However, the present invention is not limited to this method.

For example, a chronology can be displayed from a position desired by the creator of the chronology based on the initial display form information. Then, in accordance with selection by a user of the chronology providing apparatus, the chronology can be redisplayed in a previously-used form in accordance with the operation state history information, or a digest of the chronology can be displayed in accordance with the data for displaying the digest.

The above-described configuration of the chronology table and the entry table as basic information, the initial display form information (initial display form table) and the operation state history information (operation state history table) as display form information is only an example, and another configuration can also be adopted. That is, another configuration can be adopted as long as the following conditions are satisfied: a chronology can be displayed from a desired position in accordance with the intention of the creator of the chronology; information for displaying a digest of a chronology can be provided as initial display form information together with basic information; and a usage history of a chronology viewed by a viewer is accumulated in the chronology providing apparatus.

In the above-described embodiment, the chronology table, the entry table, the initial display form table, and the operation state history table are individually provided. However, the present invention is not limited to this configuration. Information about each chronology registered in the chronology table, the entry table including entries forming the chronology, and information of the initial display form table of the chronology can be managed by being registered in the same file as a unit of information. If the operation state history information is generated, the information can be added to the unit of information.

In the above-described embodiment, the present invention is applied to a personal computer, but the present invention is not limited to this. For example, the present invention can be applied to personal information processing apparatuses, such as a mobile phone terminal and a PDA (personal digital assistance), or various electronic apparatuses, such as a game machine.

Realization of Software (Program)

The apparatus and method according to the embodiment of the present invention can be realized by creating a chronology providing program and installing it to various electronic apparatuses. The chronology providing program allows a computer of the chronology providing apparatus that includes basic information obtaining means, display form obtaining means, and control means and that provides chronologic information generated by placing one or more pieces of related information according to information about elapsed time to execute the steps of: obtaining, by the basic information obtaining means, basic information associating pieces of the related information with the information about time indicating positions on the chronologic information; obtaining, by the display form obtaining means, information indicating a display form of the chronologic information; and performing control, by the control means, to provide the chronologic information to a user by displaying the chronologic information in predetermined display means based on the information indicating a display form obtained in the display form obtaining step by using the basic information obtained in the basic information obtaining step.

In this case, the information indicating a display form obtained in the display form obtaining step includes at least one of information about time to specify a piece of the related information to be displayed first in the chronologic information; information about a unit period of the chronologic information; and information for displaying a digest of the chronologic information.

The information for displaying a digest of the chronologic information obtained in the display form obtaining step is a series of chronology operation information indicating a part of the chronologic information to be displayed, a display order, and how the part is displayed.

The chronology providing apparatus includes accepting means for accepting input of an operation from a user and storage means for storing information. The chronology can be repeatedly used in a form according to an operation performed by the user by creating the chronology providing program allowing the computer of the chronology providing apparatus to execute the steps of: accepting, by the accepting means, an operation to the chronologic information provided by being displayed in the display means; storing history information of the operation to the chronologic information accepted in the accepting step in the storage means; and performing control, by the control means, to display the chronologic information in the display means based on the history information stored in the storage means.

If the history information exists, the control step performs display of the chronologic information according to the history information with higher priority than display of the chronologic information according to other information. Accordingly, the chronology can be used in a form according to an operation history of the user and then the chronology can be displayed in a display form according to the related art.

In this way, a program according to an embodiment of the present invention to realize the apparatus and method according to the embodiment of the present invention can be created. This program can be originally installed in various electronic apparatuses. Alternatively, the program can be provided by using various recording media, such as an optical disc, a magneto-optical disc, and a semiconductor memory, or via a wide area network including the Internet or digital broadcast, and then a user can install the program in a desired electronic apparatus.

Others

In the chronology providing apparatus according to this embodiment, if the operation state history information exists, the chronology as a display target is redisplayed in a previously-used form in accordance with the operation state history information. If the operation state history information does not exist and if data for displaying a digest is included in the initial display form information, a digest of the chronology is displayed in accordance with the data. However, the present invention is not limited to this method.

For example, a chronology can be displayed from a position desired by the creator of the chronology based on the initial display form information. Then, in accordance with selection by a user of the chronology providing apparatus, the chronology can be redisplayed in a previously-used form in accordance with the operation state history information, or a digest of the chronology can be displayed in accordance with the data for displaying the digest.

The above-described configuration of the chronology table and the entry table as basic information, the initial display form information (initial display form table) and the operation state history information (operation state history table) as display form information is only an example, and another configuration can also be adopted. That is, another configuration can be adopted as long as the following conditions are satisfied: a chronology can be displayed from a desired position in accordance with the intention of the creator of the chronology; information for displaying a digest of a chronology can be provided as initial display form information together with basic information; and a usage history of a chronology viewed by a viewer is accumulated in the chronology providing apparatus.

In the above-described embodiment, the chronology table, the entry table, the initial display form table, and the operation state history table are individually provided. However, the present invention is not limited to this configuration. Information about each chronology registered in the chronology table, the entry table including entries forming the chronology, and information of the initial display form table of the chronology can be managed by being registered in the same file as a unit of information. If the operation state history information is generated, the information can be added to the unit of information.

In the above-described embodiment, the present invention is applied to a personal computer, but the present invention is not limited to this. For example, the present invention can be applied to personal information processing apparatuses, such as a mobile phone terminal and a PDA (personal digital assistance), or various electronic apparatuses, such as a game machine.

In the above-described embodiment, the chronology providing apparatus obtains basic information and display form information of a chronology as a series of chronologic information to display the chronology and then displays the chronology. However, the present invention is not limited to this.

For example, if information for displaying a part of a chronology specified by a user is provided from a server apparatus on a network, a part to be viewed by many viewers can be preferentially displayed. Also, the server apparatus can be notified of the age of a viewer, and a position to be displayed first in a chronology can be determined in accordance with the age of the viewer. Alternatively, a plurality of positions to be displayed first can be set, and a user can select one of the positions to be displayed first.

A chronology may be updated as necessary by the creator of the chronology. In that case, the chronology can be displayed from the updated year. If a chronology is provided via a network and if write to the chronology is accepted, the year requested by the write can be displayed first. Alternatively, a request from a user who often writes can be preferentially accepted, and the year requested by the user can be displayed first.

The zoom level of a chronology can be changed by the apparatus in accordance with the size of the screen of the display unit 127 of the chronology providing apparatus. Alternatively, the zoom level can be automatically determined by a server apparatus that provides information for displaying the chronology in accordance with a request for the information for displaying the chronology or a function of the apparatus.

If the initial display form information and the operation state history information do not exist, the chronology can be displayed in the form of the related art, that is, displayed from its head based on the basic information.

In the above-described embodiment, the zoom level is set in units of years. However, the present invention is not limited to this. For example, the zoom level can be set in units of months in accordance with the period included in the chronology. Depending on the period included in the chronology, the zoom level can be set in units of weeks, dates, or hours.

It should be understood by those skilled in the art that various modifications, combinations, sub-combinations and alterations may occur depending on design requirements and other factors insofar as they are within the scope of the appended claims or the equivalents thereof.

What is claimed is:

1. A method for providing chronologic information, the method comprising acts, performed by at least one computer processor, of:
   (i) obtaining basic information associating a plurality of pieces of information relating to a first user with information about time, the association defining chronologic information on which the plurality of pieces of information are positioned;

(ii) analyzing the chronologic information to determine an initial display form of the chronologic information to a user other than the first user, the analyzing comprising identifying one or more first time periods during which a relatively greater number of the plurality of pieces of information relating to the first user was created and one or more second time periods during which a relatively lesser number of the plurality of pieces of information relating to the first user was created;

(iii) generating information that indicates the initial display form of the chronologic information, and that comprises an identification of a subset of the plurality of pieces of information to be initially displayed to the user other than the first user, the subset comprising pieces of information created during the one or more first time periods; and (iv) providing at least a portion of the chronologic information to a display unit for display, the providing comprising employing the information generated in the act (iii) indicating the initial display form of the chronologic information to identify the at least a portion that is provided.

2. The method according to claim 1, wherein the obtaining step comprises obtaining information for displaying a digest of the chronologic information to the user other than the first user, and the information for displaying the digest comprises a series of chronology operation information indicating a part of the chronologic information to be displayed, a display order, and how the part is displayed.

3. The method according to claim 1, further comprising the steps of:
storing history information of an operation performed on the provided chronologic information if the operation is accepted; and
repeatedly displaying the chronologic information based on the history information.

4. The method according to claim 3,
wherein, if the history information exists, performing display of the chronologic information according to the history information with higher priority than display of the chronologic information according to other information.

5. A chronology providing apparatus to provide chronologic information, the chronology providing apparatus comprising:
at least one computer processor programmed to:
obtain basic information associating a plurality of pieces of information relating to a first user with information about time, the association defining chronologic information on which the plurality of pieces of related information are positioned;
analyze the chronologic information to determine an initial display form of the chronologic information to a user other than the first user, the analyzing comprising identifying one or more first time periods during which a relatively greater number of the plurality of pieces of information relating to the first user was created and one or more second time periods during which a relatively lesser number of the plurality of pieces of information relating to the first user was created;
generate information that indicates the initial display form of the chronologic information, and that comprises an identification of a subset of the plurality of pieces of information to be initially displayed to the user other than the first user, the subset comprising pieces of information created during the one or more first time periods; and
provide at least a portion of the chronologic information to a device for display to the user other than the first user, the providing comprising employing the generated information that indicates the initial display form to identify the at least a portion that is provided.

6. The chronology providing apparatus according to claim 5, wherein the at least one computer processor is programmed to obtain information for displaying a digest of the chronologic information to the user other than the first user, and the information for displaying the digest comprises a series of chronology operation information indicating a part in the chronologic information to be displayed, a display order, and how the part is displayed.

7. The chronology providing apparatus according to claim 5, wherein the at least one computer processor is programmed to accept an operation to the chronologic information; store history information of the operation to the chronologic information; and to control a display of the chronologic information based on the stored history information.

8. The chronology providing apparatus according to claim 7, wherein the at least one computer processor is programmed to, if the history information exists, assign chronologic information having associated history information a higher priority than chronologic information having no associated history information.

9. At least one non-transitory computer-readable storage device storing a chronology providing program which, when executed by a computer, enables the computer to perform a method comprising:
obtaining basic information associating a plurality of pieces of information relating to a first user with information about time, the association defining chronologic information on which the plurality of pieces of related information are positioned;
analyzing the chronologic information to determine an initial display form of the chronologic information to a user other than the first user, the analyzing comprising identifying one or more first time periods during which a relatively greater number of the plurality of pieces of information relating to the first user was created and one or more second time periods during which a relatively lesser number of the plurality of pieces of information relating to the first user was created;
generating information that indicates the initial display form of the chronologic information, and that comprises an identification of a subset of the plurality of pieces of the information to be initially displayed to the user other than the first user, the subset comprising pieces of information created during the one or more first time periods; and
providing at least a portion of the chronologic information to a device for display to the user other than the first user, the providing comprising employing the generated information that indicates the initial display form to identify the at least a portion that is provided.

10. The at least one non-transitory computer-readable storage device according to claim 9, wherein the obtaining step comprises obtaining information for displaying a digest of the chronologic information to the user other than the first user, and the information for displaying the digest comprises a series of chronology operation information indicating a part in the chronologic information to be displayed, a display order, and how the part is displayed.

11. The at least one non-transitory computer-readable storage device according to claim 9, wherein the chronology providing program allows the computer to execute the steps of:
- accepting the operation to the chronologic information provided by being displayed in a display unit;
- storing history information of the accepted operation to the chronologic information; and
- performing control to display the chronologic information based on the history information.

12. The at least one non-transitory computer-readable storage device according to claim 11, wherein, if the history information exists, the generating step comprises assigning chronologic information having associated history information higher priority than chronologic information having no associated information.

13. The method according to claim 1, wherein the identifying of the one or more second periods in the act (ii) comprises identifying one or more periods during which at least one of the plurality of pieces of information was created.

* * * * *